Patented July 24, 1934

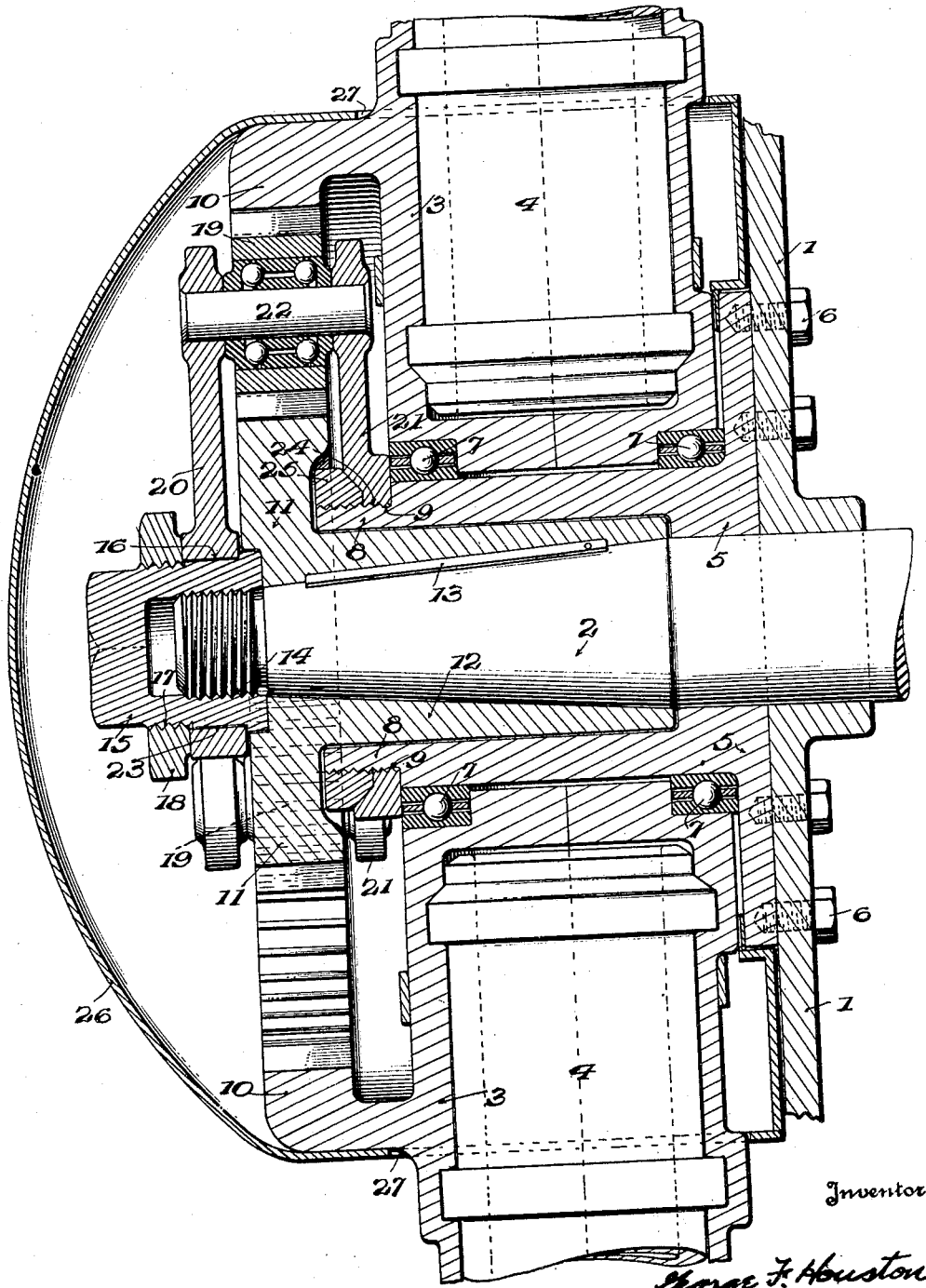

1,967,753

UNITED STATES PATENT OFFICE 1,967,753

PROPELLER

George F. Houston, South Bend, Ind., assignor to Bendix Research Corporation, East Orange, N. J., a corporation of Indiana Application October 30, 1930, Serial No. 492,316

5 Claims. (Cl. 170—177)

This invention relates to propellers, and more particularly to means for driving propellers.

It is an object of the present invention to provide a novel geared drive for a propeller.

Another object of the invention is to provide a novel geared drive for a propeller employing epicyclic gearing, the axes of rotation of which are relatively stationary.

Still another object of the invention is to provide in a propeller drive of the above type, a novel arrangement of reduction gearing employing an internally-toothed ring gear, rotation of which causes rotation of the propeller blades.

Still another object of the invention is to provide in a propeller drive of the above type, novel supporting means for the driving pinions whereby the relative positions of the driving pinions may be maintained relatively stationary.

A still further object of the invention is to provide a propeller drive of the geared type wherein the parts used shall be few in number and so arranged as to provide a strong and rugged but simple construction, whereby the stresses and strains of aircraft use may be efficiently withstood.

Other objects and novel features of the invention will appear more fully hereinafter in the following detailed description when taken in connection with the accompanying drawing. It is to be expressly understood, however, that the drawing is for the purposes of illustration only, and is not designed as a definition of the limits of the invention, reference being had for this purpose to the appended claims.

In the drawing wherein the single figure is a vertical section of a propeller blade and hub assembly with driving means therefor, a construction embodying the present invention is illustrated as comprising a supporting member 1 providing a bearing for a drive shaft 2, the latter being adapted to rotate through suitable mechanism to be more fully described hereinafter, a hub 3 which provides sockets for receiving propeller blades 4.

Means are provided for rotatably mounting the hub in order that its rotation may be effected through speed reduction gearing and not by direct connection to the drive shaft, and in the form shown, such means includes a cup-shaped supporting member 5, rigidly attached to the fixed support 1 by means of screws 6. Ball bearing means 7 are adapted to cooperate with bearing races formed on the supporting member 5 and on the hub 3 to allow free rotation of the hub about the supporting means. Formed on the outer extremity of the supporting means 5 is a reduced portion 8, externally screw-threaded as shown at 9 for a purpose to be explained hereinafter.

Means are provided for effecting rotation of the hub through suitable gearing, such means comprising an internally-toothed ring gear 10 formed integrally with the hub, or otherwise attached thereto, and adapted to cooperate with a sun gear 11, having a centrally-formed extension 12 sleeved about the drive shaft and drivably connected thereto by a key connection 13.

In order to prevent disengagement of the gear 11 from the drive shaft 2, the outer end of the latter is provided with external threads 14 on which is screw-threaded a nut or retaining member 15, the exterior of which is provided with a smooth bearing portion 16 for a purpose to be described hereinafter. Between this bearing portion and the outer extremity of the nut, the same is provided with external screw threads 17 to receive a clamping nut 18. Disposed between the ring gear 10 and the shaft-carried gear 11 are a plurality of pinion gears 19, the same forming a driving connection between gears 10 and 11 to effect rotation of the ring gear 10 when the drive shaft and gear 11 are rotated.

Means are provided for supporting, in their proper position, the pinion gears 19, and preferably such support is so constituted as to maintain the said pinions in a fixed position relative to the gears 10 and 11. Such means comprise supporting members 20 and 21 having, adjacent their outer extremities, aligned openings to receive a bearing pin 22 upon which is mounted, as by means of ball bearings, the pinion 19. Supporting member 20 is disposed externally of the gear 11 and is formed, at its inner end and in alignment with shaft 2, with an opening 23, in which is received the bearing portion 16 of the nut 15, there being a sleeve bearing fit between these parts. The other supporting member 21 is disposed between the gear 11 and the hub 3 and is formed with an opening 24, the same being coaxial with shaft 2 and formed with internal screw threads cooperating with threads 9 on the reduced portion 8 of the supporting member 5. A suitable clamping nut 25 is screw-threaded to the reduced portion 8 externally of the supporting member 21 in order to hold these parts in assembled relation.

In operation, rotation of drive shaft 2 rotates the gear 11, thereby causing rotation of pinion gears 19. Inasmuch as the pinion gear meshes with the internal ring gear 10, the latter will be rotated, thereby rotating the hub and attached propeller blades at a reduced speed relative to that of the drive shaft. The position of supports 20 and 21 and therefore pinions 19 will remain fixed with relation to the supporting member 5 since the support 21 is rigid therewith and the support 20 has a sleeve bearing fit with the nut 15 carried by the drive shaft.

A spinner 26 may be provided for covering the mechanism above described in order to protect the same from dust and dirt and to increase the aerodynamical efficiency of the structure. The spinner is provided with openings 27 through which the sockets of the hub 3 extend.

It will be evident from the foregoing description that the present invention provides novel and improved means for driving a propeller through speed reduction gearing. The invention also provides novel and improved means for mounting the various elements of the device in order to insure economy of space, simplicity of design and the use of a minimum number of parts, thus securing a light and compact structure which may be particularly adaptable for use on aircraft.

While certain specific features of this invention and parts incident thereto have been illustrated and described in detail, it will be apparent that the invention is capable of embodiment in various forms, any of which may now occur to those skilled in the art, without departing from the scope of the invention. Reference is therefore to be had to the appended claims for a definition of the limits of the invention.

What is claimed is:

1. In a geared propeller, a drive shaft having a free end, a stationary support sleeved about said drive shaft, a gear drivably connected to said drive shaft, a hub, propeller blades driven thereby, gear means mounted on said hub, a pinion between said gear and said gear means for effecting rotation of said hub, and a support for said pinion, said support having one part thereof secured to said sleeved support, and another part thereof in sleeved relation with the free end of said drive shaft.

2. In a geared propeller, a drive shaft, a retaining member thereon, a fixed support sleeved about said drive shaft, a propeller hub held on said drive shaft by said retaining member, and means to cause rotation of said hub including a pinion, a support for said pinion having a part fixed to said fixed support and a part sleeved to said retaining member.

3. In combination with a propeller blade having a hub therefor and a drive shaft for driving said hub, an internally-toothed ring gear mounted on said hub in a plane at right angles to the axis of said drive shaft, a gear connected with said drive shaft to be rotated thereby, a fixed support between said gear and said hub, a second support exterior of said gear, said second support being in sleeved relation to said drive shaft, and a pinion mounted on said supports and meshing with said gear and said ring gear.

4. In a geared propeller drive, a rigid sleeve support, a propeller hub mounted for rotation on said sleeve support, a drive shaft projecting through said sleeve and having a free end, gearing for driving said hub from said shaft including an idler gear mounted upon said sleeve and meshing with gear means carried by the shaft and the hub, all of said gearing being located upon one and the same side of said hub and said sleeve adjacent the free end of the drive shaft.

5. In a gear propeller drive, a fixed support, a hub rotatably mounted on said support, a driving shaft projecting through said support and hub and gearing for driving said hub from said shaft, said gearing being disposed in a plane parallel to the plane of the propeller and exteriorly of the hub.

GEORGE F. HOUSTON.